C. F. FORD.
AUTOMATIC COOKER.
APPLICATION FILED MAR. 1, 1919.
1,310,495.
Patented July 22, 1919.
4 SHEETS—SHEET 1.
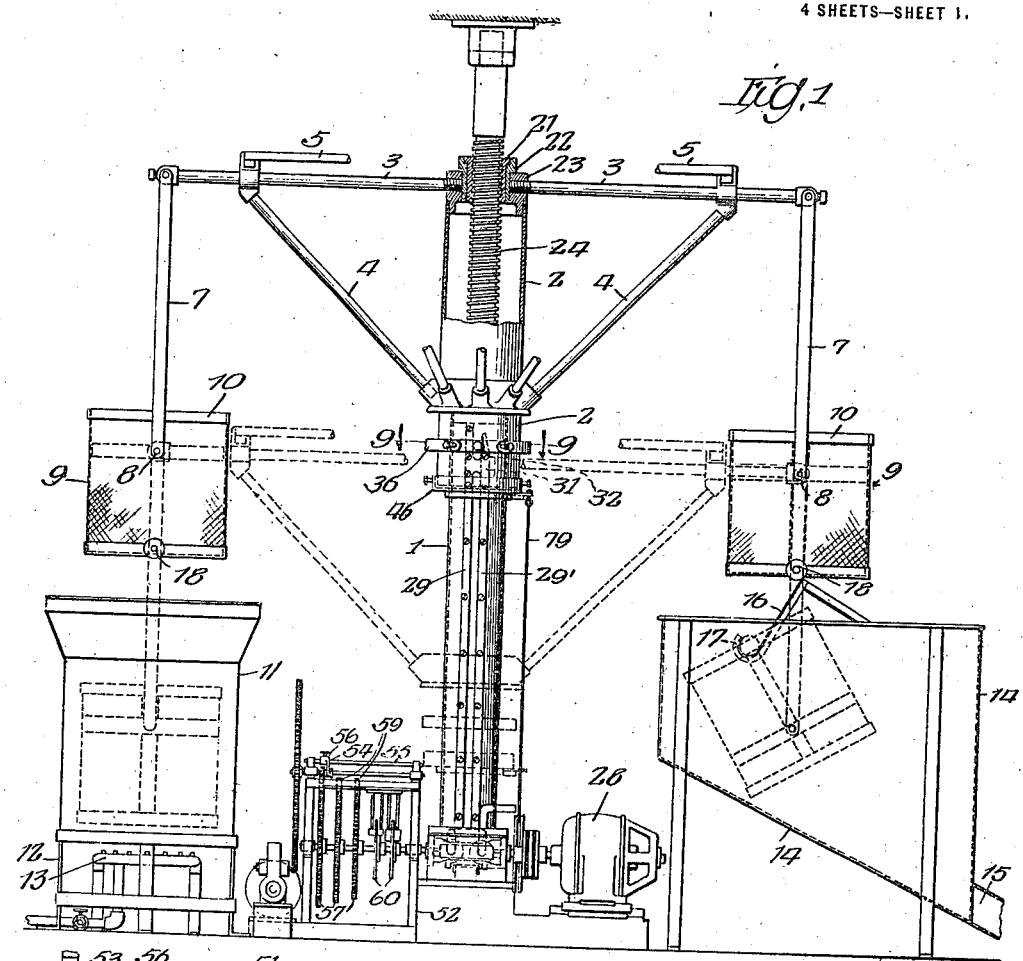
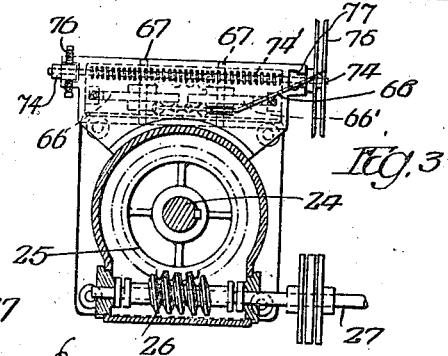
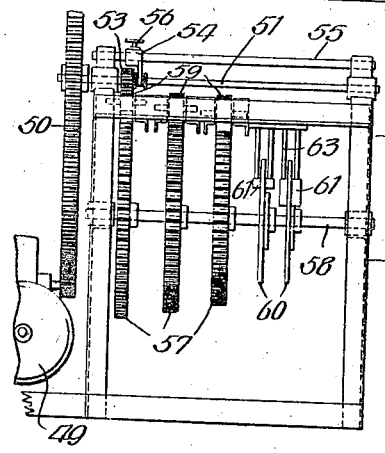
Inventor
Charles Frederick Ford
By Wm. O. Bell
Attys

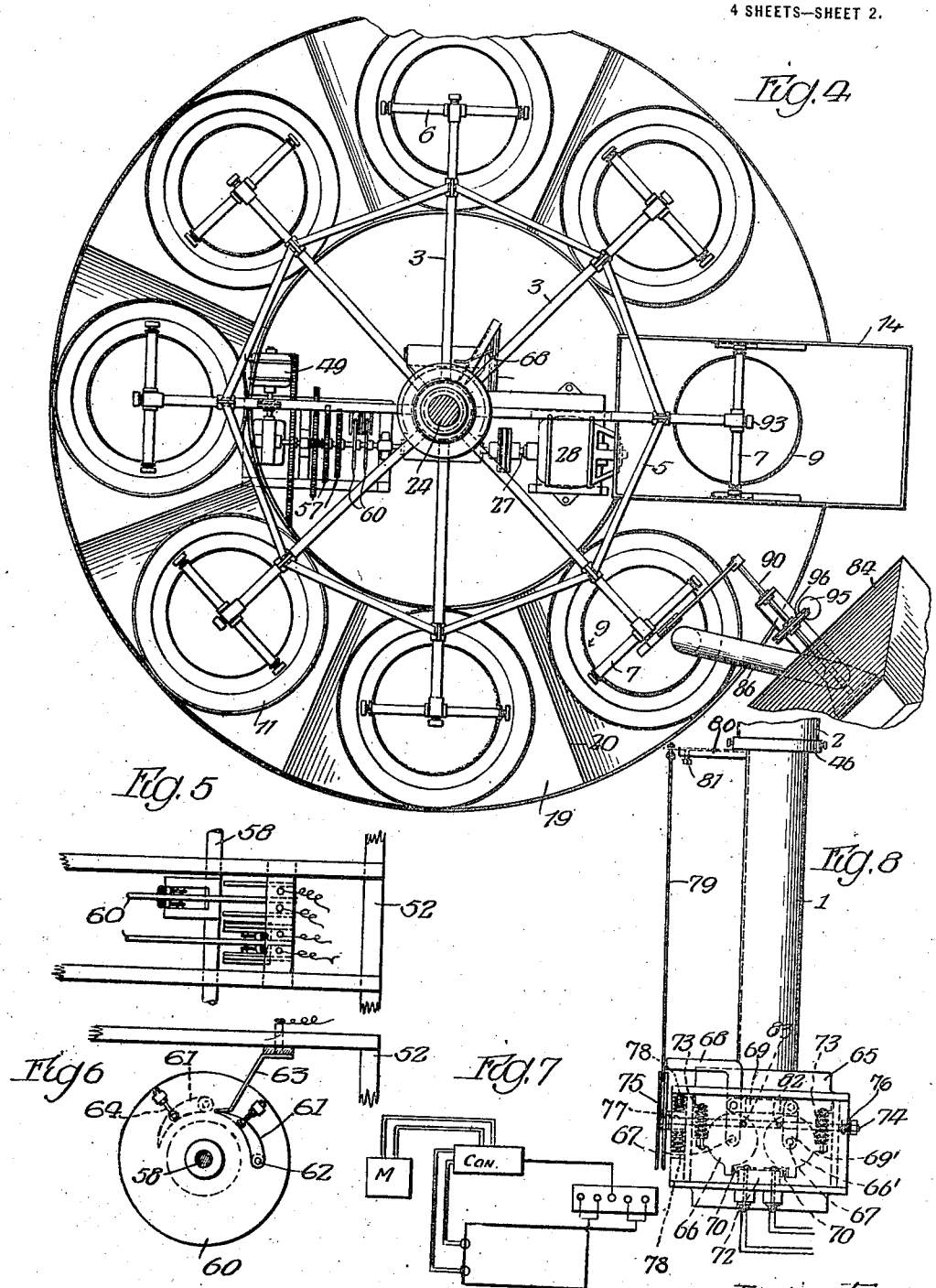

C. F. FORD.
AUTOMATIC COOKER.
APPLICATION FILED MAR. 1, 1919.

1,310,495.

Patented July 22, 1919.
4 SHEETS—SHEET 3.

Inventor
Charles Frederick Ford
By Wm. W. Belt Atty.

C. F. FORD.
AUTOMATIC COOKER.
APPLICATION FILED MAR. 1, 1919.
1,310,495.
Patented July 22, 1919.
4 SHEETS—SHEET 4.
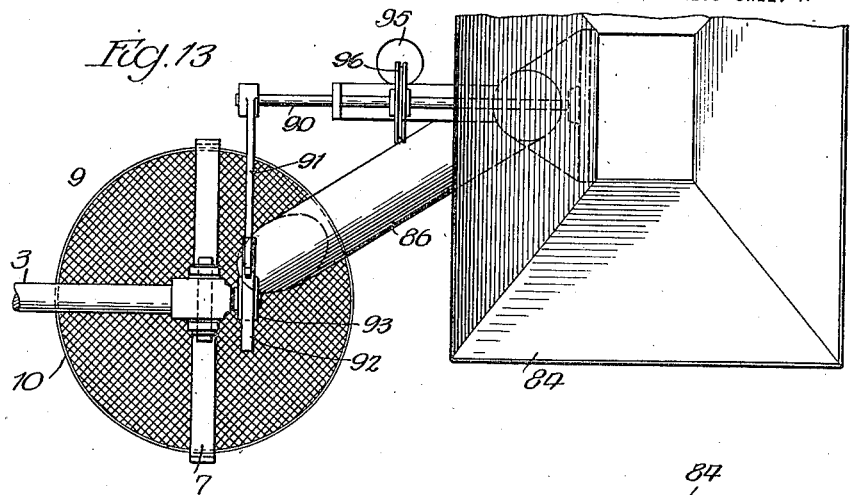
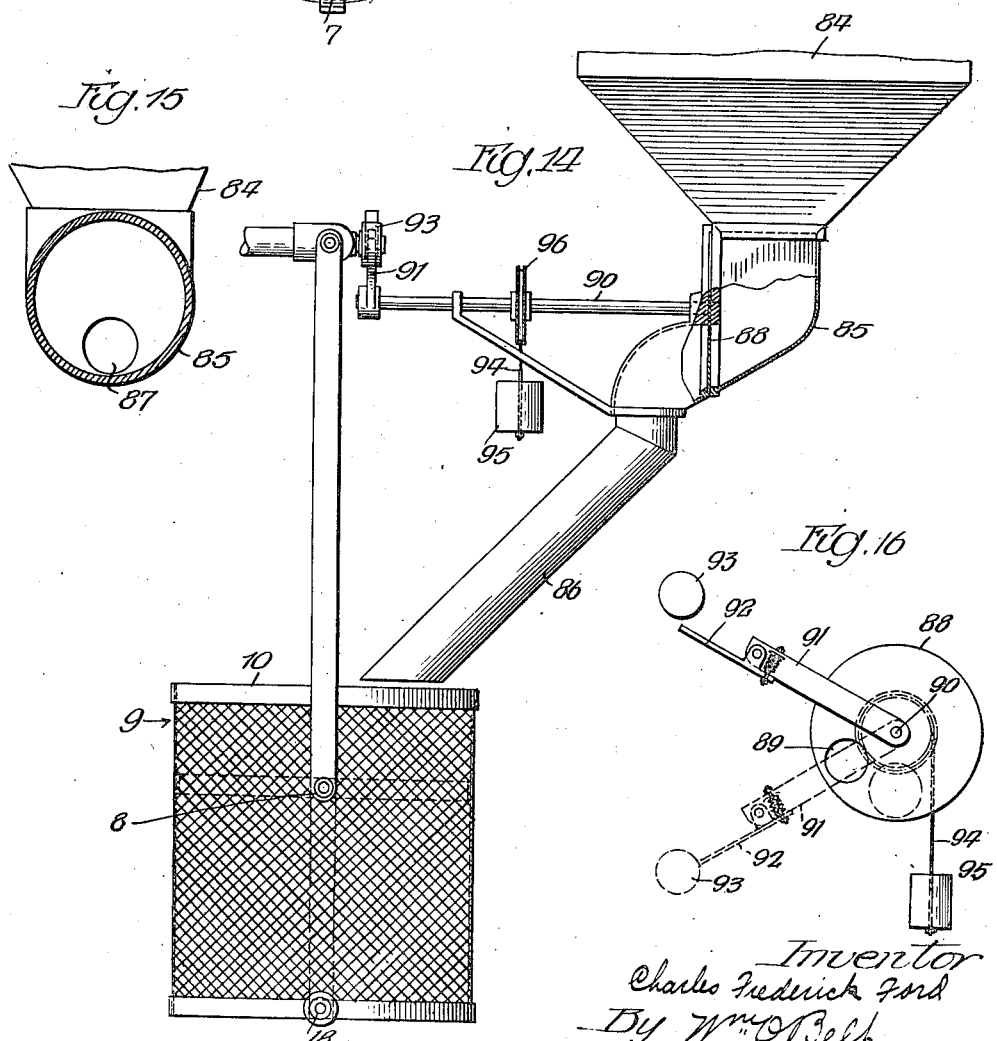
Inventor
Charles Frederick Ford
By Wm O. Belt
Atty

UNITED STATES PATENT OFFICE.

CHARLES FREDERICK FORD, OF CHICAGO, ILLINOIS.

AUTOMATIC COOKER.

1,310,495.       Specification of Letters Patent.     Patented July 22, 1919.

Application filed March 1, 1919. Serial No. 280,154.

*To all whom it may concern:*

Be it known that I, CHARLES FREDERICK FORD, a citizen of the United States, residing at Chicago, in the county of Cook and State of Illinois, have invented certain new and useful Improvements in Automatic Cookers, of which the following is a specification.

The object of this invention is, broadly, to provide an automatic machine of simple construction for cooking material by a succession of steps and which includes means for progressively subjecting the material to cooking action in a plurality of kettles and conveying the material from kettle to kettle in one complete operation. And in connection with the general cooking operation the invention also has for its objects to provide for automatically filling and for automatically discharging the receptacle which carries the material throughout the cooking operation.

The invention also has other objects in view which will hereinafter appear in the detail description of a preferred embodiment of the invention as illustrated in the accompanying drawings, in which—

Figure 1 is an elevation, partly in section, and partly broken away, showing the carrier in full lines in elevated position and indicated by broken lines in its lowered position. In this figure I have shown only two carrying receptacles to avoid confusion of lines.

Fig. 2 is a detail enlarged view of the timing mechanism;

Fig. 3 is a horizontal sectional view through the support near the bottom thereof;

Fig. 4 is a top plan view of the machine showing the worm shaft in section;

Figs. 5 and 6 are detail views of the timer switch;

Fig. 7 is a diagrammatic view illustrating the circuits;

Fig. 8 is an elevation showing the switch mechanism for limiting the upward and downward movement of the carrier;

Fig. 13 is a top plan view and Fig. 14 is an elevation, partly in section, of the filling mechanism in association with one of the carrier receptacles;

Fig. 15 is a detail sectional view of the filling hopper discharge;

Fig. 16 is a detail view of the filler operating mechanism;

Fig. 17 is a detail view showing the safety device contacts.

Figure 9:
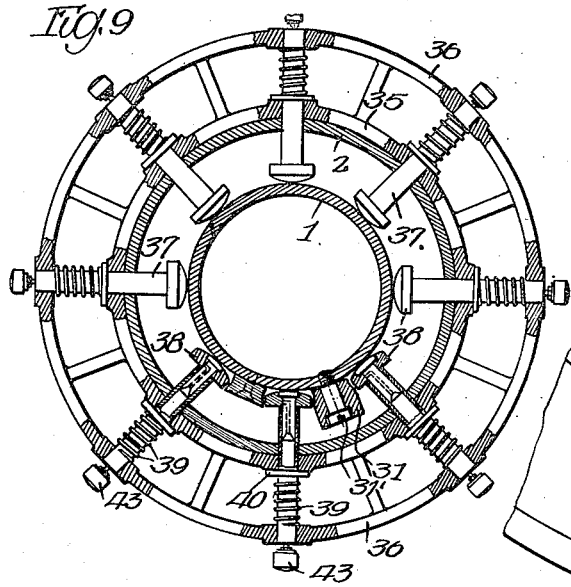
Fig. 9 is a horizontal sectional view on the line 9—9 of Fig. 1.
Figure 10:
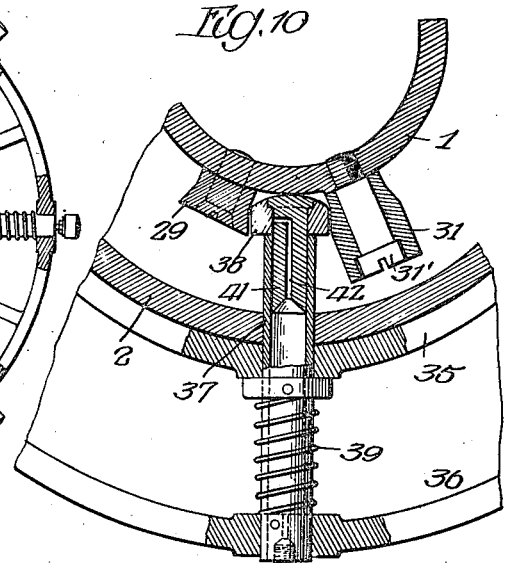
Fig. 10 is an enlarged detail sectional view of the certain parts shown in Fig. 9.

Referring to the drawings, 1 is a hollow cylindrical standard fixedly mounted on a suitable base and constituting a guide and support for the carrier. This carrier comprises a hollow sleeve 2 arranged on the standard 1 to travel lengthwise thereof, and a plurality of radial arms 3, struts 4 and braces 5 suitably connected and mounted on the sleeve and constituting the frame of the carrier. This frame can be conveniently and inexpensively made of pipe and pipe fittings but other materials may be used for the purpose as desired. Each of the radial arms 3 of the carrier frame is provided at its outer end with a cross bar 6 and hangers 7 are pivotally connected at their upper ends to the ends of the cross bar and are also pivotally connected at their lower ends to studs 8 on the receptacles 9 of the carrier. Each of these receptacles comprises a skeleton frame 10 of cylindrical form having its sides and bottom covered with wire mesh or other suitable open-work material. I may make the sides of wire mesh and the bottom of a perforated plate, or both the sides and bottom may be made of perforated sheet metal, if desired, the purpose being to provide a basket-like receptacle adapted to hold granular material and permit the cooking fluid to flow into the receptacle and thoroughly saturate the material when the receptacle is lowered into the kettle and also to permit the fluid to drain out of the receptacle when the latter is lifted out of the kettle.

The cooking kettles 11 are arranged in spaced relation corresponding to the spaced relation of the carrier receptacles and each kettle is mounted on a suitable stand 12 and heated by a gas burner 13 or other suitable source of heat.

I preferably provide for the automatic discharge of each receptacle after it has completed the round of cooking steps in the kettles and I have found it convenient to provide one kettle less than the full number of receptacles and to locate the receiving hopper 14 between the first and last kettles. This hopper may be made of any suitable size and in any suitable shape and it is provided with an outlet spout 15 which will deliver the material as required.

To automatically discharge a receptacle I provide the hopper with angularly disposed tracks 16 (Fig. 1) fastened to the sides of the hopper and projecting above the same and terminating within the hopper in curved ends 17. These tracks are arranged to be engaged by rollers 18 on the sides of the receptacle, at the bottom thereof, and in alinement with the studs 8, and when a receptacle is lowered in relation to the hopper the rollers engage the tracks and travel down these tracks until they reach and are supported in the curved ends 17. During this downward movement of the receptacle, and because the tracks incline rearwardly, the receptacle will tilt forward, and as the downward movement continues the receptacle will turn substantially upside down, insuring the complete discharge of all the material therein into the hopper. The kettles contain the cooking fluid and when the carrier is elevated the fluid will drain out of the receptacles and fall back into the kettles. I provide a drip pan 19 at the top of the kettles and the receiving hopper to catch any drippings which might otherwise fall on the floor from the receptacles when in elevated position, and while the carrier is rotating intermittently, and I prefer to make the drip pan with radial elevated ridges 20 between the kettles to insure the return of such drippings to the kettles.

The means for raising and lowering the carrier comprise a threaded collar 21 (Fig. 1) rigidly held in a bushing 22 securely mounted in the head 23 of the vertically movable sleeve 2. This collar travels on a worm shaft 24 arranged within the sleeve 2 and the standard 1 and carrying a worm gear 25 at its lower end which meshes with a worm 26 on the shaft 27 of a reversing driving motor 28 (Figs. 1, 3). It is only necessary to provide the shaft 24 with a worm thread for a sufficient distance to somewhat more than cover the limit of travel of the collar 21. The collar is preferably made of phosphor bronze and both the collar and bushing are rigidly secured within the carrier head to insure travel of the carrier vertically on the worm shaft when the latter is rotated. During this travel the carrier is restrained against the normal tendency to turn with the worm shaft until the carrier has approached its limit of upward travel and then means are provided to permit a limited rotary movement of the carrier to advance the receptacles a step in the cooking operation. This means comprises a guide track on the standard and a plurality of radial pins on the sleeve, these pins successively operating in the track to prevent rotation of the carrier, and a switch device at the top of the track which permits limited rotation of the carrier at the proper time, and which will now be described.

Figure 11:
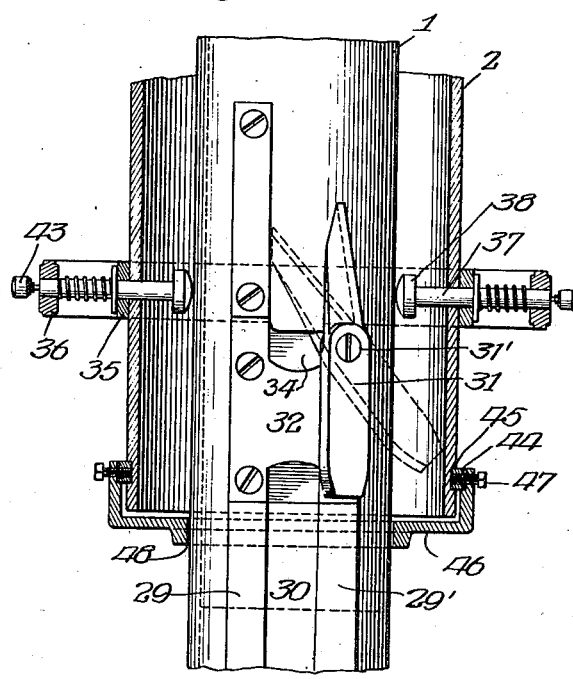
Figs. 11 and 12 are sectional views showing the devices which permit intermittent rotation of the carrier.
Figure 12:
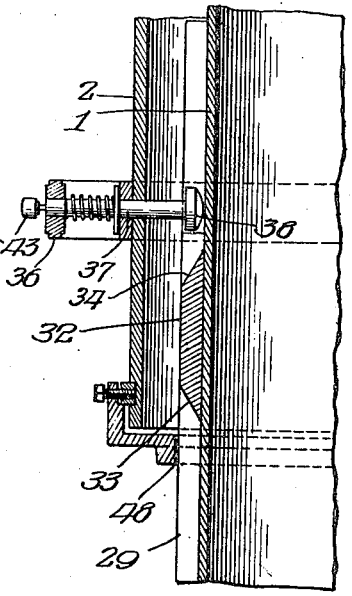

Two parallel bars 29, 29', (Figs. 9–12) are fastened to the standard 1 and spaced apart to provide a track 30 therebetween. The bar 29 extends above the bar 29' and a switch bar 31 is pivotally mounted at the upper end of the bar 29'. Between these bars and adjacent the switch bar there is a filler block 32 having an incline 33 at its lower end and an incline 34 at its upper end. A convenient construction is illustrated in Fig. 11 in which an intermediate portion of bar 29 and the filler block are made in one piece and fastened to the standard. The switch bar is pivoted at 31' to the standard 1 opposite the incline 34 on the filler block, and the lower portion of this switch bar is weighted and hangs by gravity against the filler block to form a continuation of the bar 29'.

An inner ring 35 is rigidly mounted on the sleeve 2 adjacent the lower end thereof and an outer ring 36 is suitably spaced from the inner ring. These two rings constitute guides for a plurality of radially disposed pins 37 which project through the rings and are provided with roller heads 38 which engage the standard 1. A spring 39 is arranged on each of the pins between the outer ring and a rigid flange 40 on the pin to project the pin forwardly into engagement with the standard. Each pin may constitute a grease cup and for that purpose it can be made of tubular form and provided with a plug 41 at its inner end having a bore 42 opening in the journal of the roller 38. A cap 43 screw-threaded in the outer reduced end of the tubular pin can be removed to permit insertion of grease.

The parts are so constructed and proportioned and arranged that at all times one pin will be arranged to travel in the track 30, another pin will be arranged to travel against the outer edge of the bar 29' and another pin will travel adjacent the outer edge of bar 29. In the normal operation of the machine the pin traveling in track 30 will ride against the inner edge of bar 29, the pin traveling at the right of bar 29' will ride against the outer edge of said bar, while the pin traveling at the left of bar 29 will not perform any function except as it may coöperate with the pin traveling in track 30 to prevent accidental reverse rotary movement of the carrier.

A ring 44 is seated in a groove 45 adjacent the lower end of sleeve 2 and a guide plate 46 is secured to this ring by set screws 47. The plate 46 is arranged on the standard 1 and constitutes a bottom guide for the sleeve 2. The plate is recessed at 48 (Fig. 12) to accommodate the bars 29, 29' and these bars seated in said recess will prevent the plate from turning with the sleeve 2. Thus the bottom guide travels with the sleeve in its vertical movement before the ring 44 slides in the groove 45 and the plate remains relatively fixed in the turning movement of the carrier.

The switch bar 31 is weighted to normally hang in upright position, as indicated in full lines in Fig. 11. When the motor 28 is operated to raise the carrier it will be restrained from the normal tendency to rotate induced by the worm shaft, as before stated, until the pin traveling in track 30 rides up incline 33 onto filler block 32, at which time the pin riding against the lower portion of switch bar 31 (then constituting a continuation of bar 29') prevents rotation of the carrier. When this latter pin passes the pivot 31' of the switch bar in the upward movement of the carrier, the switch bar is swung to the dotted position shown in Fig. 11 by the side pressure of the pin which has traveled up against the outer edge of bar 29' and the restraint against rotative movement of the carrier being temporarily released the carrier will rotate a step. The switch bar constitutes a guide for this pin during the conjoint upward and rotative movement of the carrier until the pin engages the inner edge of the upper end portion of bar 29 which thus limits the rotative movement of the carrier. During this part of the upward movement of the carrier the pin which has ridden up onto the filler block 32 travels obliquely across said block and drops down into position adjacent the outer edge of the upper portion of bar 29 at or just before the time the aforementioned pin rides off the switch bar into engagement with the inner edge of bar 29. Thus the carrier is rotated a step when it has neared the limit of its upward movement, at which time the receptacles have been lifted out of the kettles and the discharge hopper and each receptacle is re-positioned to be lowered into the kettle in advance of the one from which it has been lifted, or into the discharge hopper. After the pin has ridden off of switch bar 31 the latter will swing by gravity back from dotted position to its normal full line position (Fig. 11) and on the downward movement of the carrier the pin which is now riding against the inner edge of the upper portion of bar 29, and alone restraining the normal tendency of the carrier to rotate, will travel up incline 34 onto filler block 32, but by this time the next adjacent pin to the left will be riding against the outer portion of the bar 29 and will restrain the carrier against rotation. As the carrier continues its downward travel the pin on filler block 32 will travel down incline 33 into track 30 and it will thereafter coöperate with the pin which has ridden down against the outer side of bar 29 and against the inner edge of bar 29' to prevent rotation of the carrier.

The reversing motor 28 is timed through a suitable controller (not shown) to operate the carrier intermittently at certain predetermined intervals by a timing mechanism shown in Figs. 1, 2, 5 and 6. This mechanism comprises a continuously operating motor 49 which drives a large gear 50 on the shaft 51 journaled in suitable bearings in a frame 52. A pinion 53 is slidably mounted on the shaft 51, but keyed to revolve therewith and a block 54 slidably mounted on the rod 55 is engaged with the pinion and is adapted to be locked in adjusted position by a set screw 56. A plurality of gears 57 of different diameter are mounted on the shaft 58 and these gears mesh respectively with idle gears 59 journaled in bearings in the frame 52. By adjusting the block 54 on rod 55 the pinion 53 can be adjusted to mesh with one of the gears 59 and thereby drive the shaft 58 at a selective rate of speed.

A pair of fiber disks 60 are mounted on the shaft 58 to revolve therewith and each of these disks is provided with a pair of contact pieces 61, one on each side of the disk, pivotally mounted on a pin 62 extending transversely through the disk. Spring contact fingers 63 mounted on the frame 52, but insulated therefrom, are arranged in the path of the contact pieces to establish an electric circuit during that portion of the revolution of the disk when the contact pieces and the oppositely disposed spring fingers are in engagement. The contact pieces on one disk are of sufficient length to open an electric circuit through the controller for operating the motor 28 and rotate the worm shaft to elevate the carrier. The contact pieces on the other disk are so disposed with relation to the contact pieces on the first-mentioned disk and are of such length that when the circuit is in a similar manner established thereby through the controller to the motor 28, the latter will be operated in a reverse direction to lower the carrier from its elevated position. The position of the pair of contact pieces on one disk relative to the pair of contact pieces on the other disk is indicated by the dotted contact piece and the full line contact piece shown in Fig. 6. The position of the contact pieces of one disk with relation to those of the other disk may be changed to time the movements of the carrier in any manner desired, as will be readily understood. A suitable device 64 may be mounted on the disks for adjusting each contact piece 61 with relation to its finger 63 to provide for wear of the contact fingers and to secure perfect contact. Both the timing mechanism and the controller may be located in any desirable place away from the machine and wires connected thereto for operating the machine.

To insure stopping the carrier at the predetermined limit of its upward and downward movements, the length of which might vary somewhat if the timer alone were depended upon for this purpose, I provide a safety device shown in Figs. 3 and 8 and comprising a casing 65 suitably disposed at the bottom of the standard 1 and having therein a pair of fiber disks 66, 66' mounted on shafts 67 supported in the casing. An angle arm 68 projects outward through the frame and is connected at its inner end to the shaft of disk 66. This angle arm is also connected by pivotally connected links 69, 69' with the shaft of disk 66'. Each of these disks carries contacts 70 (Fig. 17) arranged to engage the contact plates 71 mounted on a fiber block 72 in the casing and connected in circuit with the motor 28. Expansion springs 73 are connected to the disks 66, 66' and to the casing and operate on the disks to hold the contacts 70 normally in closed position. A shaft 74 carrying a pulley 75 is mounted in a rocking bearing 76 at one end and in a bearing 77 floating between the springs 78 at the other end. A cable 79 is attached to the pulley and to an arm 80 fastened to the bottom plate 46 of the sleeve 2, this arm being provided with a set screw 81 on its underside which is arranged to engage the angle arm 68 and which can be employed to make a finer adjustment of the limit of travel of the carrier than can be made by adjusting the cable alone.

In practice the safety device is employed to stop the motor at the limit of the upward and at the limit of the downward travel of the carrier and it is employed to supplement the timing device and to provide positive limits to the travel of the carrier. On the downward movement of the carrier, spring 74' on shaft 74 will turn said shaft to wind up cable 79 and the set screw 81 will engage and swing angle arm 68 on its pivot 67 and this arm will pull on link 69 and swing link 69' on its pivot 67 and against a pin 82 on the disk 66', thereby revolving the disk sufficiently to withdraw the contact 70 from the contact plates 71 and breaking the circuit through the controller to the motor 28. On the upward travel of the carrier when the cable 78 becomes taut it will swing shaft 74 in its bearings sufficiently to engage the pulley 75 with angle arm 68 and swing this arm on its pivot 67 against a pin 83' on disk 66 sufficiently to withdraw the contacts 70 on this disk from contact plates 71, thereby breaking the circuit through the controller to the motor 28.

I also provide automatic means for filling the receptacle immediately after it has been emptied and while it is being lowered into the first kettle of the series. A supply hopper 84 has a spout 85 communicating with a chute 86 which is arranged to discharge into the receptacle 9. The spout has an opening 87 which is normally closed by a disk 88 provided with a corresponding opening 89. The disk is mounted on a shaft 90 which carries an arm 91 provided with a yieldingly mounted end 92 arranged in the path of a roller 93 on the end of each of the radial arms 3. When the carrier begins its descent lowering the empty receptacle 9 into the first kettle, the roller 93 on the radial arm associated with the empty receptacle will swing the arm 91 and rock the shaft 90, thereby revolving disk 88 and registering opening 89 therein with opening 87 in the spout 85 and permitting material in the supply hopper to flow into the empty receptacle. A full charge of material will have been delivered into the receptacle by the time the latter is lowered sufficiently to carry the roller 93 beyond the end 92 of arm 91. During the rotary motion of shaft 90, as described, the cable 94 carrying weight 95 and traveling on pulley 96 rigid with shaft 90, will wind up on the pulley, and immediately roller 93 releases the operating arm 91, 92 the weight 95 will reverse the rotary movement of shaft 90 and move disk 88 until opening 89 is out of register with opening 87.

My invention provides a comparatively simple automatic machine for cooking material in a plurality of successive steps without requiring any attention on the part of the operator, and further than this it provides a machine which may be maintained in constant operation without the attention of an operator, automatically filling the receptacles, moving the receptacles step by step and from one kettle to another in an intermittent progressive cooking operation and automatically discharging the material after the cooking operation is completed. The machine may be timed in any manner desired to vary the length of time the material remains in the kettles or length of time the material is passing from one receptacle to another and many other changes in the form and proportion of parts and in the details of construction of my invention may be made within the scope of the appended claims without departing from the spirit or sacrificing the advantages of the invention.

I have found my invention especially adapted for making salted peanuts. The shelled peanuts are loaded into the basket receptacles and subjected to the progressive cooking operation in the kettles containing cocoanut oil or other suitable cooking fluid.

The invention may be used for other purposes to which it is or may be readily adapted.

I claim:

1. An automatic cooker comprising a plurality of kettles, a plurality of receptacles containing the material to be cooked, and means for automatically lowering the receptacles into the kettles, raising the receptacles from the kettles and advancing them to and lowering them in the next adjacent kettles.

2. An automatic cooker comprising a plurality of kettles, a carrier, a plurality of receptacles on the carrier containing the material to be cooked, and means for imparting to the carrier an intermittent movement to progressively subject the material in the receptacles to cooking action in the various kettles.

3. An automatic cooker comprising a plurality of kettles, a carrier, a plurality of receptacles suspended from the carrier and containing the material to be cooked, and means for automatically subjecting the material in said receptacles to cooking action progressively in the various kettles.

4. An automatic cooker comprising a plurality of kettles, a carrier, a plurality of receptacles suspended from the carrier and containing the material to be cooked, and means for imparting an intermittent lowering rotating and rising movement to the carrier to subject the material in the receptacles to a progressive cooking action in the various kettles.

5. An automatic cooker comprising a plurality of kettles, a carrier, a plurality of receptacles on the carrier containing the material to be cooked, means for reciprocating the carrier in a vertical direction, and means for intermittently rotating the carrier step by step at or about the limit of its upward movement.

6. An automatic cooker comprising a plurality of kettles, a carrier, a plurality of receptacles on the carrier containing the material to be cooked, and means for imparting intermittently to the carrier an upward movement, a limited rotary movement near the limit of its upward movement, and a lowering movement after the completion of the upward and intermittent rotary movements.

7. An automatic cooker comprising a plurality of kettles, a worm shaft, a carrier arranged to travel vertically on said shaft and having an intermittent rotary movement on the shaft, a plurality of receptacles on the carrier containing the material to be cooked, and means for intermittently operating said shaft.

8. An automatic cooker comprising a plurality of kettles, a worm shaft, a carrier having a reciprocating travel on said shaft, means for rotating the carrier a step at each reciprocation of the carrier, and a plurality of receptacles on the carrier containing the material to be cooked and adapted to be progressively arranged in the kettles.

9. An automatic cooker comprising a plurality of kettles, an upright worm shaft, a carrier having a reciprocating travel on said shaft, a plurality of receptacles containing the material to be cooked on said carrier and adapted to be arranged progressively in the kettles, and means for imparting a limited rotary movement to the carrier when the receptacles have been lifted by the carrier out of the receptacles.

10. An automatic cooker comprising a plurality of kettles, an upright shaft, a carrier arranged to travel up and down on said shaft, a plurality of receptacles on the carrier containing the material to be cooked, means for raising and lowering said carrier coaxially with the shaft, and means for imparting an intermittent rotary movement to the carrier to position the receptacles progressively above the kettles.

11. An automatic cooker comprising a plurality of kettles, a standard, a carrier slidably mounted on the standard, a plurality of receptacles on the carrier containing the material to be cooked, means for operating the carrier to lower the receptacles into the kettles and to raise them out of the kettles, and means for rotating the carrier intermittently to advance the receptacles step by step before lowering them into the kettles.

12. An automatic cooker comprising a plurality of kettles, a standard, a guide on the standard, a carrier slidably mounted on the standard and guided by said guide, a plurality of receptacles on the carrier containing the material to be cooked, and means for rotating the carrier intermittently.

13. An automatic cooker comprising a plurality of kettles, a standard, a guide track on the standard, a carrier, a plurality of receptacles on the carrier containing the material to be cooked, means on the carrier engaging said track to guide the carrier in its up and down movement, and a switch device permitting the carrier to rotate a limited distance after the carrier has raised sufficiently for the receptacles to clear the kettles.

14. An automatic cooker comprising a plurality of kettles, a standard, a track on said standard, a carrier reciprocally slidable on the standard, a plurality of receptacles on the carrier containing the material to be cooked, radially disposed guide pins on the carrier arranged for successive engagement with said track, a switch device for permitting a limited rotary movement to said carrier after the receptacles have cleared the kettles in the upward movement of the carrier, and means for operating said carrier.

15. An automatic cooker comprising a plurality of kettles, a standard, guide bars on the standard spaced apart to form a guide track, a carrier slidable on the standard, a plurality of receptacles on the carrier containing the material to be cooked, a plurality of radially disposed yielding pins on the carrier arranged to successively engage the guide bars and track, a pivoted switch bar on one guide bar to permit a limited rotary movement of the carrier when the receptacles have cleared the kettles, and means for operating the carrier.

16. An automatic cooker comprising a plurality of kettles, a standard, a plurality of receptacles on the carrier containing the material to be cooked, a guide track and guide bars on the standard, a plurality of radial spring-pressed pins on the carrier successively engaging said track and bars, a filler in said track and having inclines at its top and bottom, and a pivoted switch bar at the upper end of one track bar to permit limited rotary movement of the carrier when the receptacles have cleared the kettles.

17. An automatic cooker comprising a plurality of kettles, a standard, a carrier slidable vertically on the standard, a plurality of receptacles on the carrier containing the material to be cooked, means for operating the carrier to raise the receptacles out of the kettles and to advance the carrier rotatively a step and to lower the receptacles into the next adjacent kettles, and means for timing the intermittent operation of the carrier.

18. An automatic cooker comprising a plurality of kettles, a vertically movable carrier, a plurality of receptacles on the carrier containing the material to be cooked, and means for limiting the upward and downward movements of the carrier.

19. An automatic cooker comprising a plurality of kettles, a carrier, a plurality of receptacles on the carrier containing the material to be cooked, means for imparting a vertically reciprocating movement to the carrier, and means for limiting the upward and downward movements of the carrier comprising a motor circuit, fixed contacts in said circuit, a pair of disks pivotally mounted, movable contacts on said disks, lever devices for operating the disks, and means for operating said lever devices.

20. An automatic cooker comprising a plurality of kettles, a carrier, a plurality of receptacles on the carrier containing the material to be cooked, means for imparting a vertically reciprocating movement to the carrier, and means for limiting the upward and downward movements of the carrier comprising a motor circuit, fixed contacts in said circuit, a pair of disks pivotally mounted, movable contacts on said disks, lever devices for operating the disks, a floating shaft, a pulley on said shaft, a cable attached to said pulley and to the carrier, and a device on the carrier to engage said lever devices.

21. An automatic cooker comprising a plurality of kettles, a carrier, a plurality of receptacles on the carrier containing the material to be cooked, means for raising and lowering the carrier, and a timing device for said means comprising a motor circuit, a pair of constantly-rotating disks, contacts on said disks and spring contacts arranged in the path of said contacts during the rotation of said disks to close the circuit and energize said motor at intervals.

22. An automatic cooker comprising a plurality of kettles, a carrier, a plurality of receptacles on the carrier containing the material to be cooked, a receiving hopper, means for operating the carrier intermittently to arrange the receptacle successively in the kettles and hopper, and means for discharging the contents of the receptacle as it is arranged in the hopper.

23. In an automatic cooker, a hopper, a carrier intermittently rotatable, a plurality of receptacles pivotally suspended from the carrier, tracks on said hopper, and projections on said receptacles to engage said tracks to upend the receptacle in the hopper.

24. In an automatic cooker, an intermittently rotatable carrier, a plurality of receptacles on the carrier to receive the material, a supply hopper having a discharge spout, a shaft, a valve disk on said shaft and having an opening therein, a chute leading from said spout, an arm on said shaft adapted to be engaged by the carrier to rock the shaft and register the opening in the disk with the spout to permit the discharge of material from the hopper into a receptacle, and means for restoring the parts to normal position.

CHARLES FREDERICK FORD.